Patented July 31, 1951

2,562,808

UNITED STATES PATENT OFFICE 2,562,808

WAX PHENOL ESTER OF SUBSTITUTED SUCCINIC ACID AND WAX MINERAL OIL COMPOSITIONS CONTAINING SAME

Louis A. Mikeska, Westfield, N. J., assignor to Standard Oil Development Company, a corporation of Delaware No Drawing. Application August 21, 1948, Serial No. 45,559

2 Claims. (Cl. 252—57)

This invention relates to novel condensation products and to methods of preparing and using the same, and more particularly it relates to the treatment of high molecular weight chemical condensation products having wax modifying properties and having the ability to depress the pour point of waxy mineral oils when added thereto in small amounts, and to improve the pour stability characteristics thereof.

Wax modifying agents or pour depressants have been prepared by a number of different methods known to the art such as by condensation of relatively long chain paraffinic materials, for example chlorinated paraffin wax having a chlorine content of about 10 to 18% chlorine derived from a paraffin wax or olefins with aromatic hydrocarbons such as naphthalene, benzene, anthracene and the like or with hydroxy derivatives thereof such as phenol and its homologues. Such condensation is generally effected by means of a Friedel-Crafts catalyst preferably aluminum chloride or others such as zinc chloride, iron chloride or other halides of these metals. The condensation is generally carried out at temperatures ranging from about room temperature to 300° F. During the reaction, inert solvents may be used such as refined kerosene or heavy petroleum naphtha, or inert highly chlorinated solvents such as tetrachlorethane, dichlorbenzene and the like.

Such condensation products are generally complex mixtures of chemical compounds having an average molecular weight between the approximate limits of 500 and 2500. Ordinarily such products have good pour depressing potency and even very small amounts of the compound such as 0.01 or 0.05% may effect substantial pour depressing action.

While the wax modifiers made in the above manner have excellent pour depressing properties as measured by A. S. T. M. procedure, they do not have as good pour stability properties as desired. More specifically under certain conditions of winter storage wherein the lubricant is subjected to widely varying cycles of temperature, the pour point of a blend of waxy mineral lubricating oil containing such pour depressant may on certain occasions rise to relatively high values such as to render ineffective the original purpose of the pour depressant.

It has recently been proposed to improve wax phenol pour depressants by partially resinifying the wax substituted phenolic compounds with a resinification agent such as an aldehyde, polyhydric alcohols, a sulfur reagent and the like. It has also been proposed to improve wax phenol pour depressants by reaction with an acylating agent containing a monobasic or a dibasic acyl chloride or other acyl radicals. It was found that esterification of the wax phenol with monobasic acids would generally improve the stability characteristics of the material but would lower its potency. On the other hand, esterification with dibasic acid in most cases increases the potency of wax phenols but yields pour unstable products. For example, in a given test oil, the addition of ¼ of 1% of untreated wax phenol reduced the initial pour point of the oil from +30° F. to −25° F. On esterification of the above described wax phenol with stearyl chloride, a product was obtained which when blended with the same test oil in ¼ of 1% concentration reduced the pour point of the latter to only −15° F. Similarly when a given wax phenol was esterified with a dilinoleic acid, it markedly improved the pour reducing properties of the former. The pour stability of the blend was effected adversely, in that the blend of the unesterified wax phenol was stable at −22° F.; the blend of the ester solidified at +18° F. The same proved to be true, when a given wax phenol was esterified with fumeryl chloride. A 0.25% blend of the unesterified wax phenol lowered the pour point of the test from +30° F. to only +15° F. but the blend was stable at −22° F. A 0.25% blend of the ester, on the other hand, lowered the pour point of the test oil from +30° F. to <−35° F., but in the stability test the blend solidified at +15° F.

It has now been discovered and it is the chief feature of the present invention that the pour stability characteristics of wax phenol can be improved greatly by subjecting the wax modifiers to esterification with dibasic acids containing a long chain of carbon atoms containing from 8 to 18 carbon atoms, preferably from 12 to 18 carbon atoms. Examples of such esterifying acids are alkenyl succinic acids

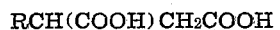

RCH(COOH) CH₂COOH where R represents an alkyl group containing at least 8 carbon atoms preferably 12 to 18 carbon atoms. When R represents a branched chain, the pour stability of the modified wax phenol thus obtained is improved but the pour reducing potency is not materially changed. When R consists of a straight chain, containing 8 or more carbon atoms, particularly if the chain is saturated, the pour stability as well as the potency of the resulting ester is far superior to the original wax phenol. Alkylthiosuccinic acids, which can be readily obtained by condensing alkyl or aryl mercaptans with the esters of maleic, itaconic, or furaric esters: RSCH(COOH)CH₂COOH may also be used for this purpose. Alkyl thiohexhydrophthalic acids, which can be obtained by condensing tetrahydro-pathalic acids with alkyl mercaptans as well as alkoxy succinic acids and alkoxy hexahydro phthalic acids may be also used. The esterification reaction is brought about under substantially the following conditions:

The ester may be obtained by treating the wax phenol with the dichloride of the dibasic acid at slightly elevated temperature. The esters may also be obtained by subjecting a mixture of the wax phenol and an appropriate dibasic acid, to azeotropic distillation in the presence of a catalyst. The esters may also be obtained conveniently by means of an ester interchange reaction between wax phenol and methyl, ethyl or propyl ester of alkenyl succinic acids.

The final condensation product of this invention has a substantially higher molecular weight than the wax modifying starting material and exhibits the following characteristics:

The esters are usually obtained as very viscous oils or soft resins readily soluble in mineral oils.

The object and the advantages of the invention will be better understood from the following example:

EXAMPLE 1

*Esters of wax phenols and alkenyl succinic acid*

In order to determine whether pour stable products could be obtained by esterification of wax phenol with alkenyl succinic acids, an ester of this type was prepared as follows:

A 3-way flask equipped with a stirrer, a return condenser and a calcium chloride filled drying tube, was charged with 217.6 gms. (0.40 mol) wax phenol, 73.0 gms. (0.2 mol) of the acid chlorides of alkenyl succinic acids, containing 14 to 16 carbon atoms in the alkenyl group, and 300 cc. of benzene. The mixture was then refluxed for 10 hours with rapid stirring. Hydrogen chloride was given off copiously at first but ceased towards the end of the reaction.

On cooling, the mixture was treated with water and stirred for ½ hour at room temperature to decompose any unreacted acid chloride. The mixture was then extracted with ether, washed with water and dried over sodium sulfate. On removal of the solvents on the steam bath, the reaction product was obtained as a viscous brown residue weighing 253 gms.

That the product was pour stable and considerably more active than the original wax phenols may be seen from the data given below. The ASTM pour points were determined on blends of the two products in a paraffinic oil of S. A. E. 20 grade.

| Esters | | Original Wax Phenols | |
| --- | --- | --- | --- |
| Per Cent Conc. | A.S.T.M. Pour | Per Cent Conc. | A.S.T.M. Pour |
| 0 | +30° F. | 0 | +30° F. |
| 0.25 | −15° F. | 0.25 | 0° F. |
| 0.50 | −35° F. | 0.50 | −30° F. |
| 1.00 | −35° F. | 1.00 | −35° F. |
| Pour Stable at −22° F. | | Pour Stable at −22° F. | |

It will be noted that the esters are considerably more active weight per weight than the original wax phenols, in spite of the fact that the weight of the esters is almost 20% greater than that of the wax phenols. That the pour stability of the wax phenols was not affected adversely may be seen from the fact that both blends remained fluid at −22° F. in the pour stability test.

It is not intended that the invention be limited to the specific examples which have been mentioned merely for the sake of illustration nor necessarily by any theory as to the mechanism of the operation of the invention but only by the appended claims in which it is intended to claim all novelty inherent to the invention as well as all modifications coming within the scope and spirit of the invention.

It is claimed:

1. A product consisting essentially of a wax phenol ester of a substituted succinic acid, said substituent group being an unsubstituted long chain hydrocarbon group containing from 12 to 18 carbon atoms.

2. A lubricating composition having a low stable pour point consisting essentially of a major proportion of a waxy mineral lubricating oil and a small but pour depressing amount of a wax phenol ester of a substituted succinic acid, said substituent group being an unsubstituted long chain hydrocarbon group containing from 12 to 18 carbon atoms.

LOUIS A. MIKESKA.

REFERENCES CITED

The following references are of record in the file of this patent:

UNITED STATES PATENTS

| Number | Name | Date |
| --- | --- | --- |
| 2,048,465 | Reiff | July 21, 1936 |
| 2,048,466 | Reiff | July 21, 1936 |
| 2,138,809 | Reiff | Nov. 29, 1938 |
| 2,366,735 | Lieber | Jan. 9, 1945 |
| 2,417,281 | Wasson et al. | Mar. 11, 1947 |